(12) United States Patent
Mailloux

(10) Patent No.: US 9,770,109 B2
(45) Date of Patent: Sep. 26, 2017

(54) PORTABLE SEAT

(71) Applicant: Denis Mailloux, New Haven, CT (US)

(72) Inventor: Denis Mailloux, New Haven, CT (US)

( * ) Notice: Subject to any disclaimer, the term of this patent is extended or adjusted under 35 U.S.C. 154(b) by 0 days.

(21) Appl. No.: 14/931,674

(22) Filed: Nov. 3, 2015

(65) Prior Publication Data

US 2017/0119159 A1    May 4, 2017

(51) Int. Cl.
| A47C 4/04 | (2006.01) |
| A47C 1/14 | (2006.01) |
| A47C 7/00 | (2006.01) |
| A47C 3/40 | (2006.01) |
| A01M 31/00 | (2006.01) |

(52) U.S. Cl.
CPC ............... *A47C 4/04* (2013.01); *A01M 31/00* (2013.01); *A47C 1/14* (2013.01); *A47C 3/40* (2013.01); *A47C 7/004* (2013.01)

(58) Field of Classification Search
CPC .... A47C 4/04; A47C 1/14; A47C 3/40; A47C 7/004; A01M 31/00
USPC ................................................. 297/16; 42/94
See application file for complete search history.

(56) References Cited

U.S. PATENT DOCUMENTS

| 3,990,537 | A | 11/1976 | Swenson |
| 4,150,733 | A | 4/1979 | Plummer |
| 4,266,748 | A | 5/1981 | Dalton |
| 4,600,082 | A | 7/1986 | Rauls |
| 4,700,914 | A | 10/1987 | Cheetham |
| D299,189 | S | 1/1989 | Large et al. |
| 5,411,313 | A | 5/1995 | Counihan et al. |
| 5,507,111 | A | 4/1996 | Stinson et al. |
| 5,715,625 | A * | 2/1998 | West, III ................. F41A 23/16 42/94 X |
| 5,933,999 | A | 8/1999 | McClure et al. |
| 5,974,719 | A | 11/1999 | Simonek |
| 5,975,635 | A | 11/1999 | Parpala |
| 6,035,572 | A | 3/2000 | Goode, Jr. |
| 6,058,641 | A * | 5/2000 | Vecqueray ............... F41A 23/12 42/94 X |
| 6,637,708 | B1 | 10/2003 | Peterson |
| 6,726,163 | B2 | 4/2004 | Eppard et al. |
| 6,935,064 | B1 * | 8/2005 | Thompson ............... F41A 23/34 42/94 X |
| 7,219,679 | B2 | 5/2007 | Hsu et al. |
| 7,281,347 | B2 * | 10/2007 | Carpenter ............... F41A 23/14 42/94 X |
| 7,740,308 | B2 | 6/2010 | Mishly |
| 8,683,909 | B1 | 4/2014 | Copus |

* cited by examiner

*Primary Examiner* — Anthony D Barfield
(74) *Attorney, Agent, or Firm* — Foley & Lardner LLP

(57) ABSTRACT

A portable hunting seat includes a pole assembly having a first end and an opposing second end, the first end configured to engage a ground surface and the opposing second end spaced from the first end by a length of the pole assembly. The portable hunting seat includes a seat positioned along the length of the pole assembly, between the first end and the second end, and a gun rest extending from the second end of the pole assembly. The seat and the gun rest are movably coupled to the pole assembly such that the portable hunting seat is selectively reconfigurable between a deployed orientation and a transport orientation.

13 Claims, 14 Drawing Sheets

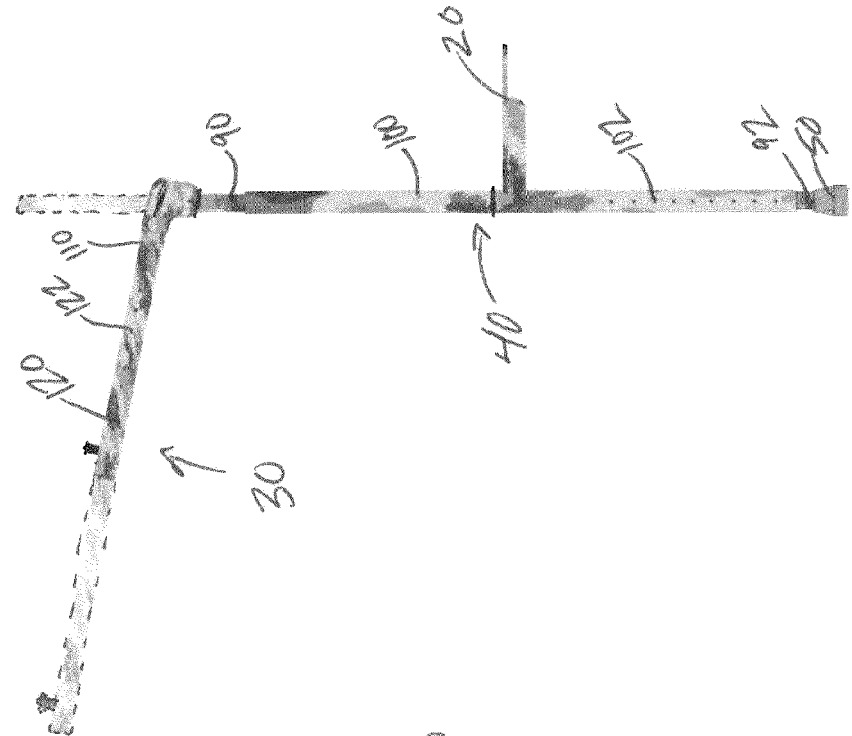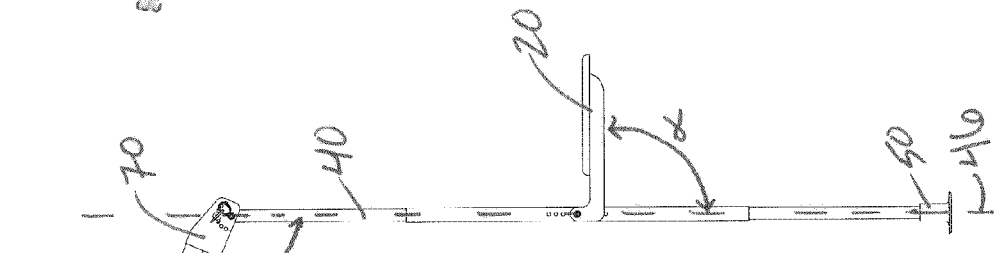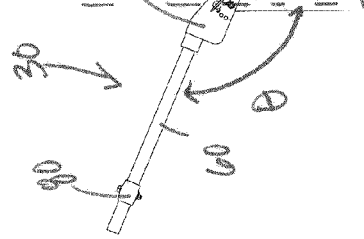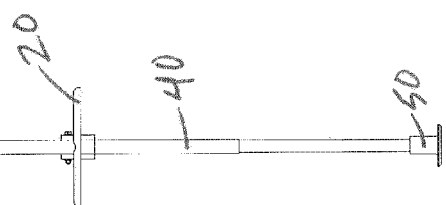

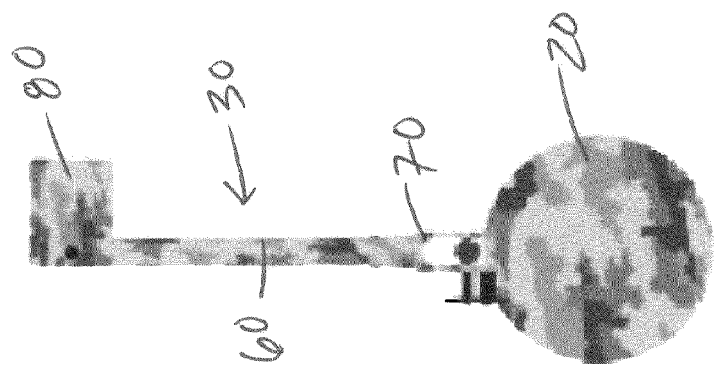
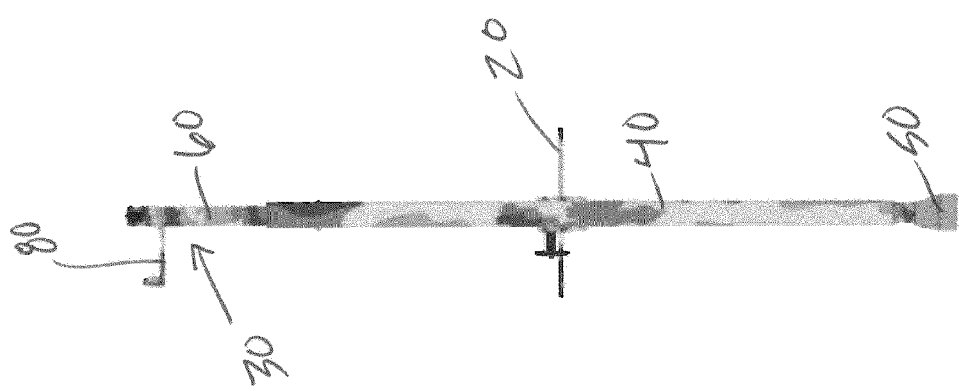

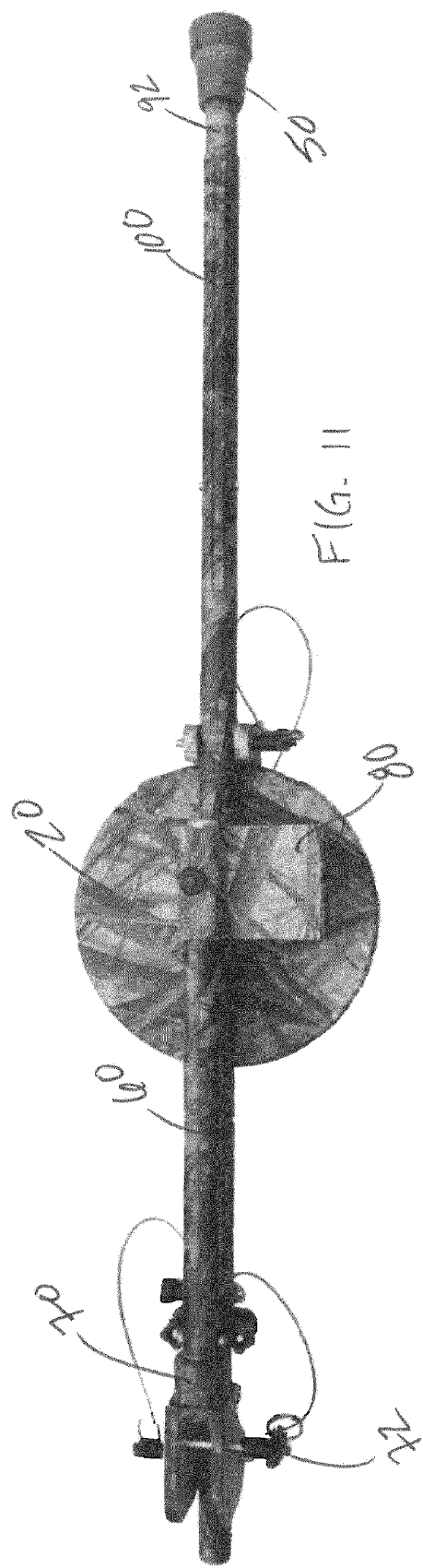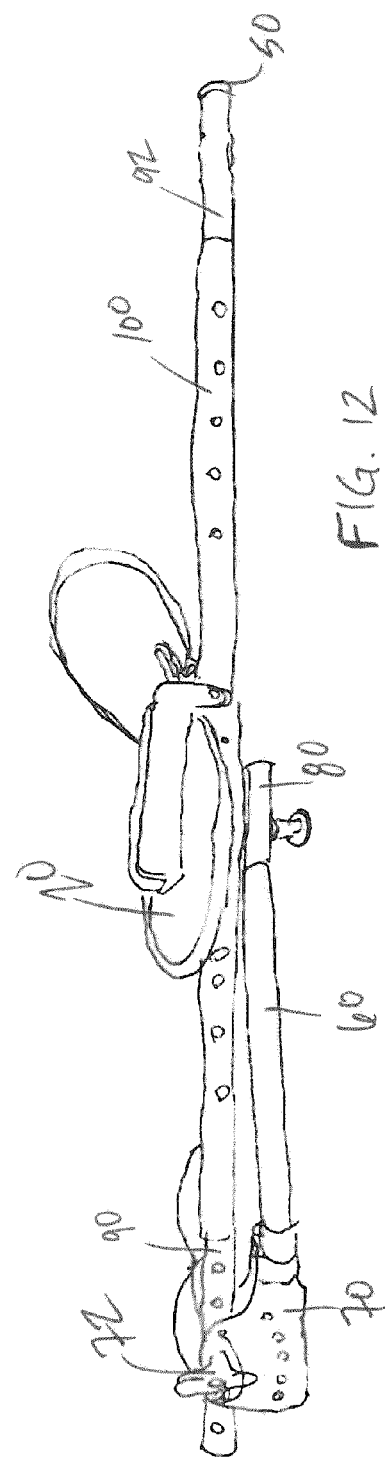

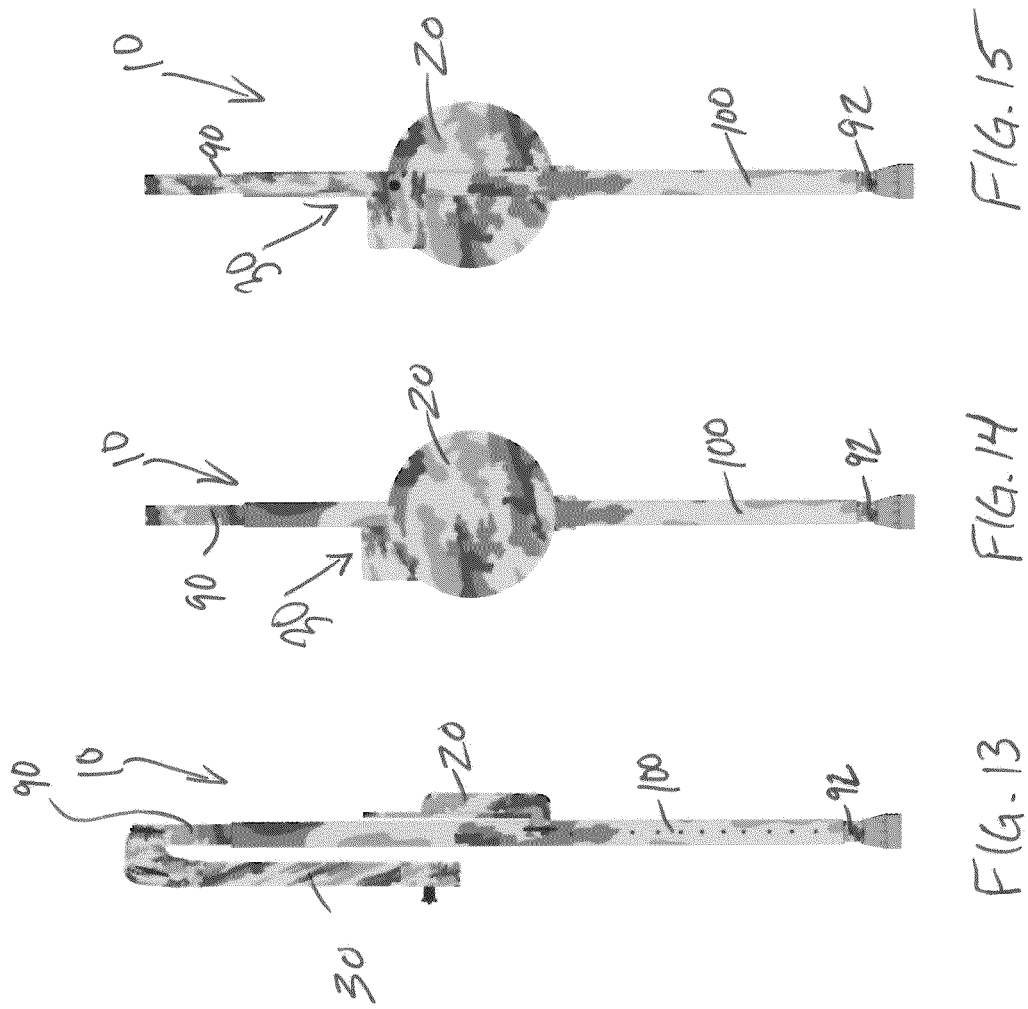

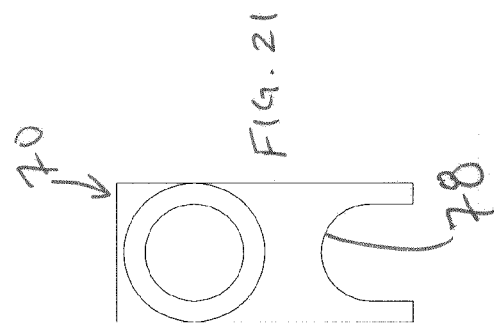
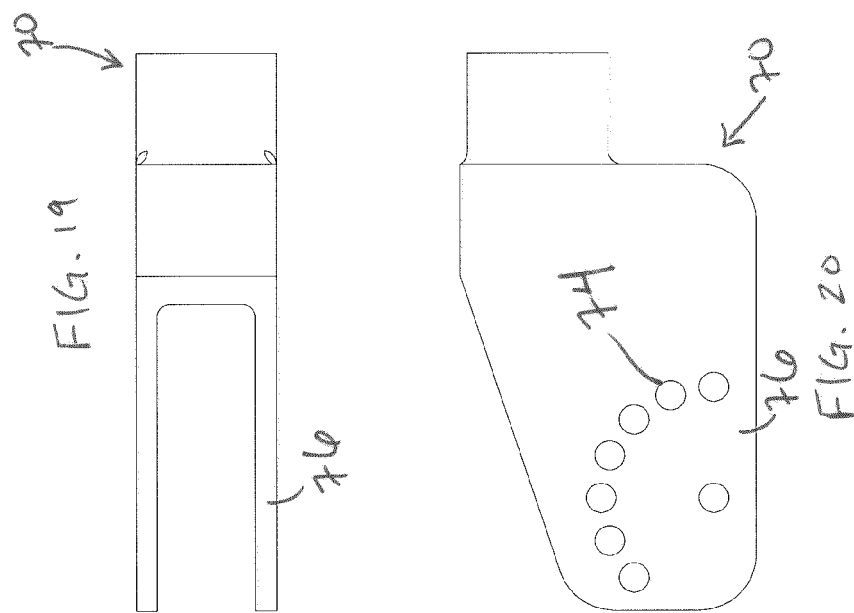
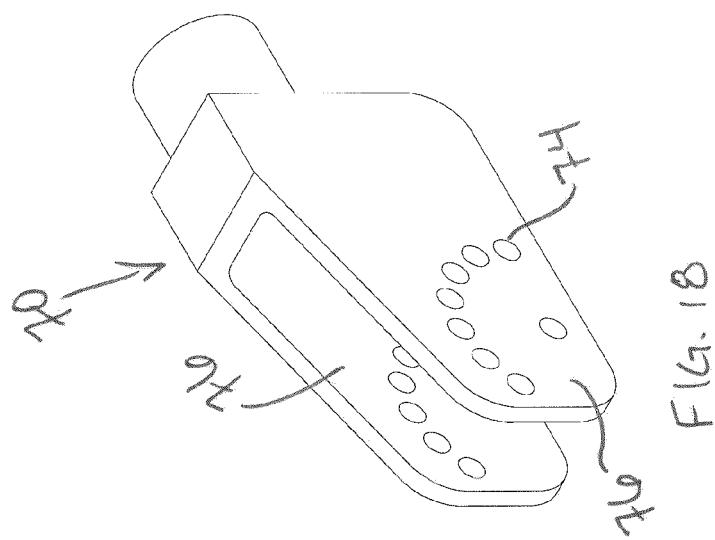

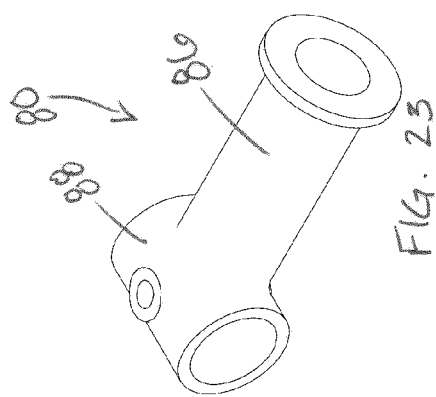
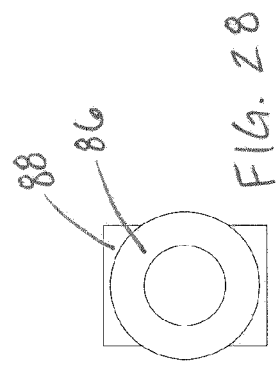
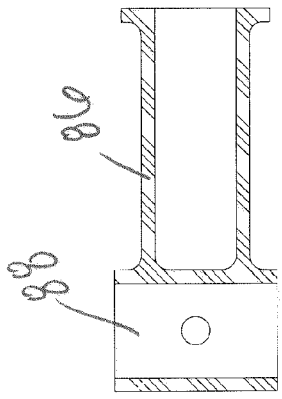
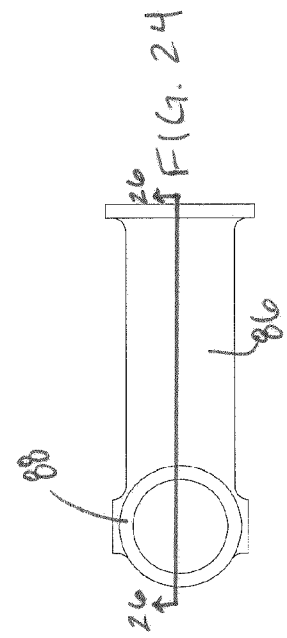
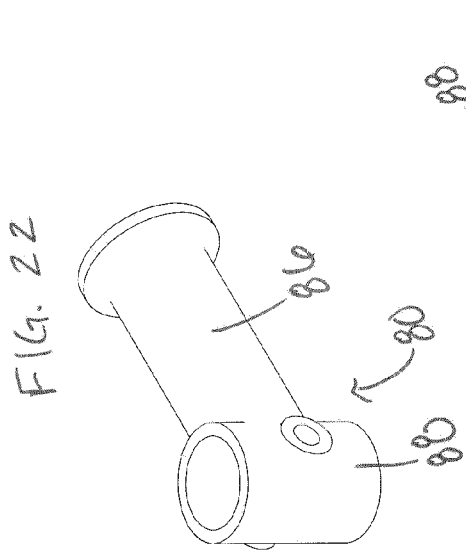
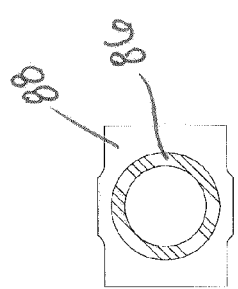

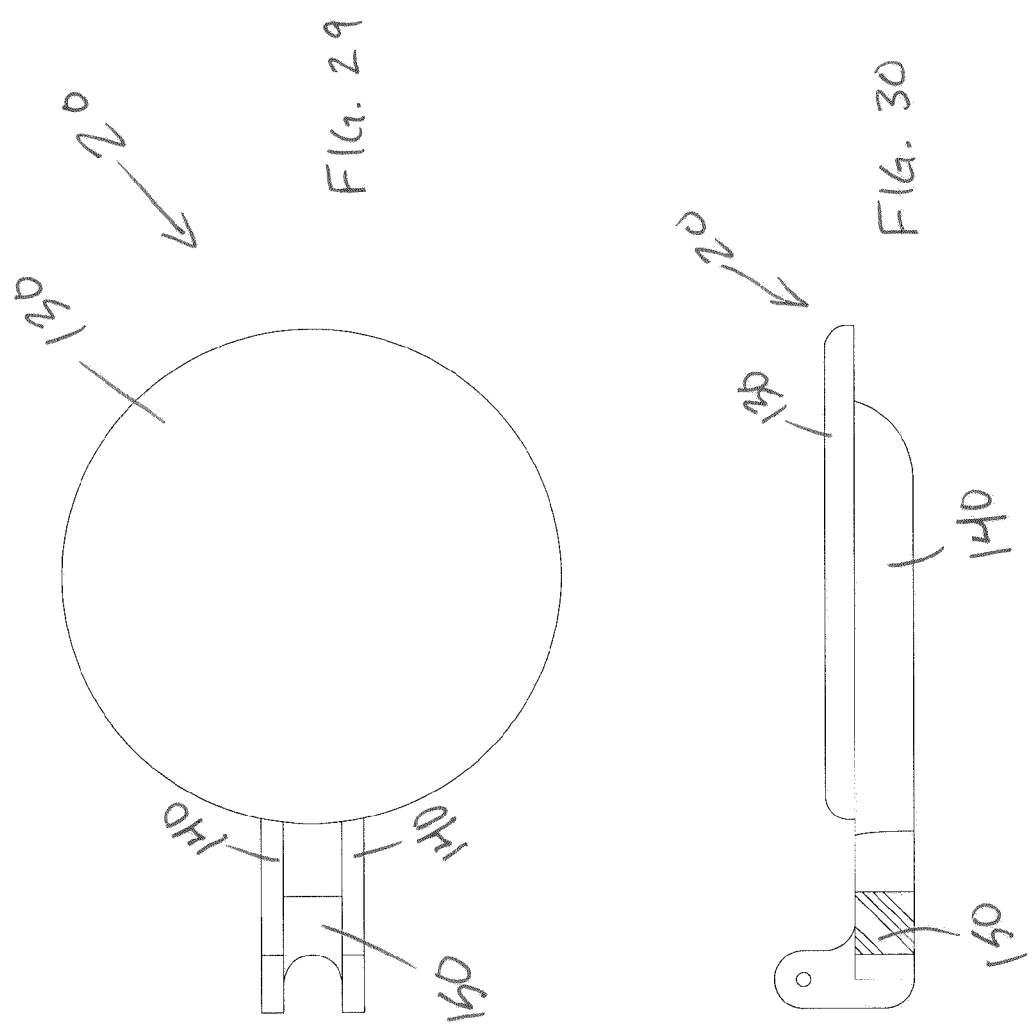

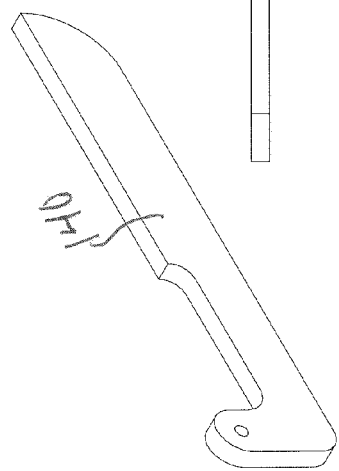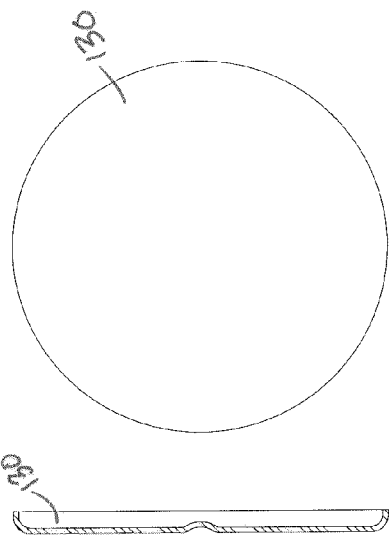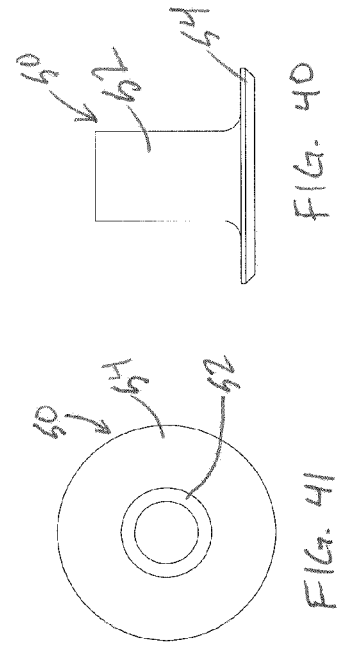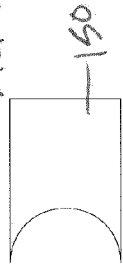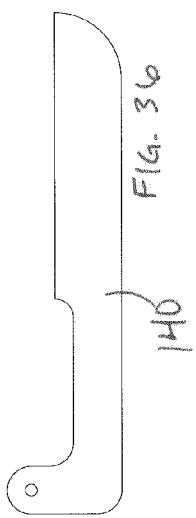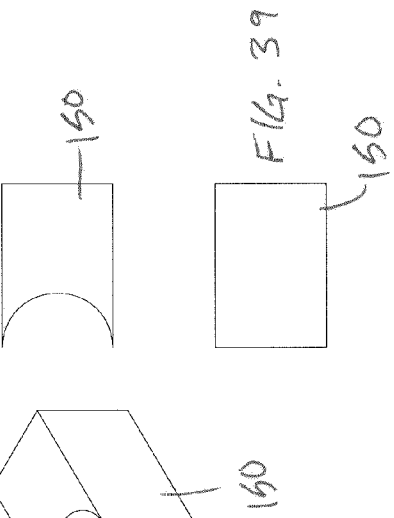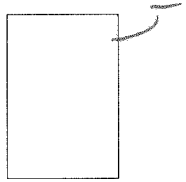

PORTABLE SEAT

BACKGROUND

The present disclosure relates to portable seats. In particular, the present disclosure relates to portable seats for use in hunting and wildlife photography.

Portable seats often rest upon a ground surface and/or are supported by a tree. Other portable seats have a number of legs that support the user above the ground surface. Such devices may lack a rest upon which a hunter or photographer may support a gun or a camera. Such devices may also fatigue the user after long periods of use and/or require extensive setup to deploy.

SUMMARY

One embodiment of the disclosure relates to a portable hunting seat that includes a pole assembly having a first end and an opposing second end, the first end configured to engage a ground surface and the opposing second end spaced from the first end by a length of the pole assembly. The portable hunting seat includes a seat positioned along the length of the pole assembly, between the first end and the second end, and a gun rest extending from the second end of the pole assembly. The seat and the gun rest are movably coupled to the pole assembly such that the portable hunting seat is selectively reconfigurable between a deployed orientation and a transport orientation.

Another embodiment of the disclosure relates to a portable seat that includes a pole assembly having a first end and an opposing second end, the opposing second end spaced from the first end by a length of the pole assembly. The portable seat further includes a seat positioned along the length of the pole assembly, between the first end and the second end, and a rest having an elongated shape and including a proximal end coupled to the second end of the pole assembly. The seat and the rest are movably coupled to the pole assembly such that the portable seat is selectively reconfigurable between a first orientation and a second orientation.

Still another embodiment of the disclosure relates to a method of using a portable seat that includes unfolding a seat into a use orientation, the seat pivotally attached along a length of a pole assembly and angled relative to the pole assembly when unfolded into the use orientation, positioning a first end of the pole assembly in contact with a ground surface, unfolding a rest, the rest pivotally attached to an opposing second end of the pole assembly, angling the pole assembly forward, and forming a tripod structure for stabilizing the rest by straddling the pole assembly and sitting on the seat.

The invention is capable of other embodiments and of being carried out in various ways. Alternative exemplary embodiments relate to other features and combinations of features as may be recited in the claims.

BRIEF DESCRIPTION OF THE FIGURES

The disclosure will become more fully understood from the following detailed description, taken in conjunction with the accompanying figures, wherein like reference numerals refer to like elements, in which:

FIGS. 6-10 are plan views of a portable seat in a first orientation, according to an exemplary embodiment;

FIGS. 11-15 are perspective and plan views of a portable seat in a second orientation, according to an exemplary embodiment;

FIGS. 18-21 are perspective and plan views of a yoke of a rest for a portable seat, according to an exemplary embodiment;

FIGS. 22-28 are perspective and plan views of a rifle rest of a rest for a portable seat, according to an exemplary embodiment;

FIGS. 29-39 are perspective and plan view of a seat and components thereof for a portable seat, according to an exemplary embodiment; and FIGS. 40-42 are plan views and a perspective view of a foot for a portable seat, according to an exemplary embodiment.

DETAILED DESCRIPTION

Figure 1:
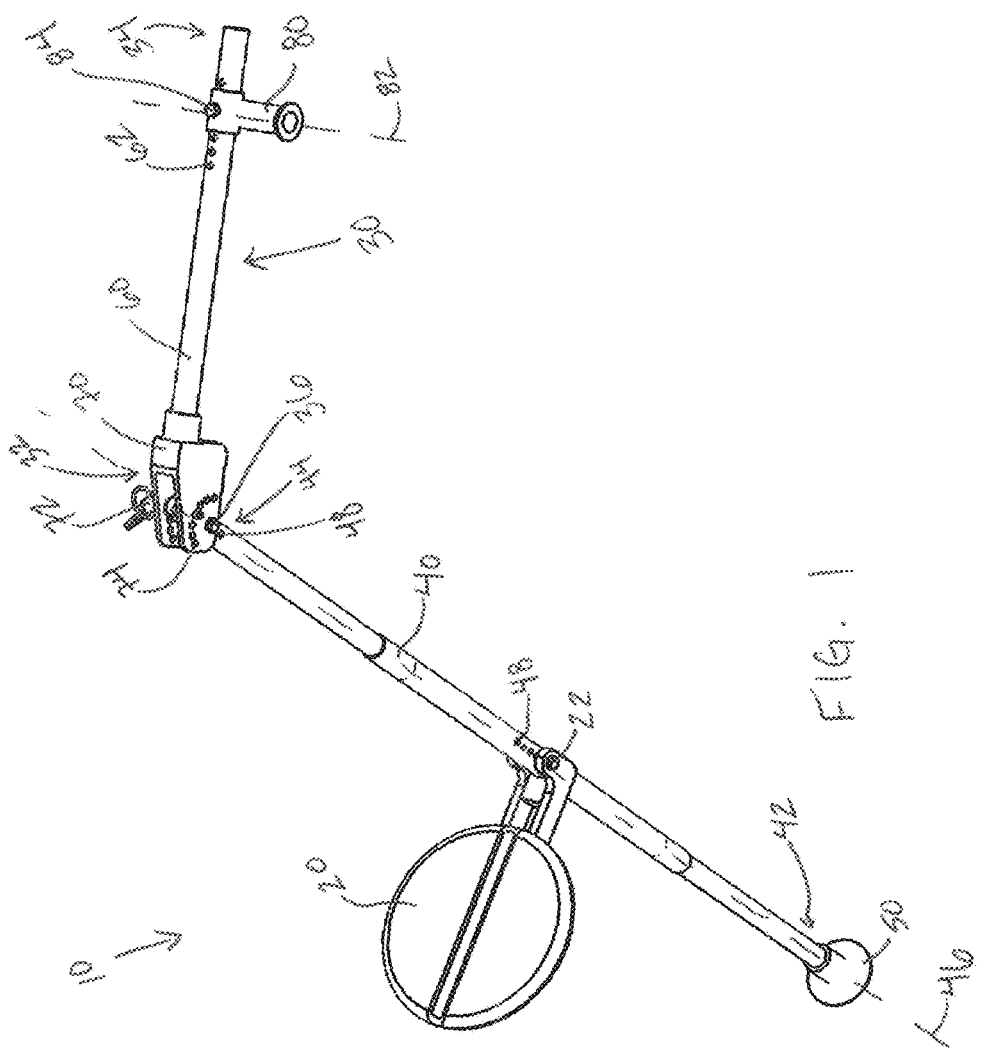
FIGS. 1-5 are perspective views of a portable seat in a first orientation, according to an exemplary embodiment.

According to an exemplary embodiment, a portable seat (e.g., a portable hunting seat, a portable wildlife photography seat, etc.) includes a seat upon which a user sits and a rest. The seat and the rest are coupled to a pole assembly (e.g., a single pole, one or more poles telescopically or otherwise attached to one another, etc.). The seat is positioned along the length of the pole assembly. By way of example, the seat may be positioned at a midpoint of the pole assembly. In operation, a user straddles the pole assembly and sits on the seat, facing the rest. The pole assembly thereby extends upward from the seat and away from the user. A first end of the pole assembly and the user's feet engage a ground surface to stabilize the rest, which may be positioned at, coupled to, and/or extend from an opposing second end of the pole assembly. With the user sitting on the seat, the pole assembly may extend along the torso of the user (i.e., the user may lean over the pole assembly). The user may rely upon the rest to stabilize a long gun, a camera, or still another device.

In one embodiment, the portable seat includes a single pole assembly that is configured to engage the ground surface (i.e., the seat itself has only one leg). One or more of the user's feet serve as ground interfaces (e.g., supplemental interfaces, etc.) to supplement the stability provided by the pole assembly (e.g., 90 degrees, an acute angle, an obtuse angle, etc.) and balance the user sitting on the portable seat. In some embodiments, the seat is angularly offset relative to the pole assembly such that, when oriented in a use position, the portable seat would lack stability (e.g., tip over, tip forward, etc.) absent the user's weight forcing the pole assembly into engagement with the ground surface and the user's feet pressing into the ground in front of the portable seat. The portable seat has a single pole assembly (e.g., a single leg, etc.), facilitating repositioning the portable seat. Such repositioning may be particularly important when the user is attempting to target or track game. By way of example, the rest or another portion of the portable seat may be selectively repositioned or reoriented in response to the bend in a user's knees and/or rotation of the user's torso (e.g., the rest of the portable seat may be configured to tip downward in response to a greater bend in the user's knees, the rest of the portable seat may be configured to tip upward in response to a reduced bend in the user's knees, etc.). The portable seat therefore facilitates a user's ability to fluidly target or track moving game without mechanically adjusting one or more components of the portable seat itself (e.g., without mechanically adjusting the seat, without mechanically adjusting the rest, etc.). The portable seat may be deployed easily, thereby facilitating a user's desire to utilize the portable seat when spotting and stalking game. The portable seat may be configured for use in a freestanding orientation (i.e., without the user supported by a tree or other structure) such that recoil may be absorbed by a greater portion of the user.

According to the exemplary embodiment shown in FIGS. 1-5, a portable seat (e.g., a portable hunting seat, a portable wildlife photography seat, etc.), shown as portable seat 10, includes a seat, shown as seat 20, and a rest, shown as rest 30. In one embodiment, portable seat 10 facilitates user comfort while positioning the user in a concealed position and providing a steady gun rest to facilitate accurate shot placement. Portable seat 10 is one or more of lightweight and portable, is comfortable for extended periods of use, provides an ambidextrous, steady gun rest, offers a wide perimeter of coverage, is adaptable to various terrains and conditions, is stable under recoil, adjusts to fit a particular user, and may be movably deployed quickly and easily.

Figure 2:
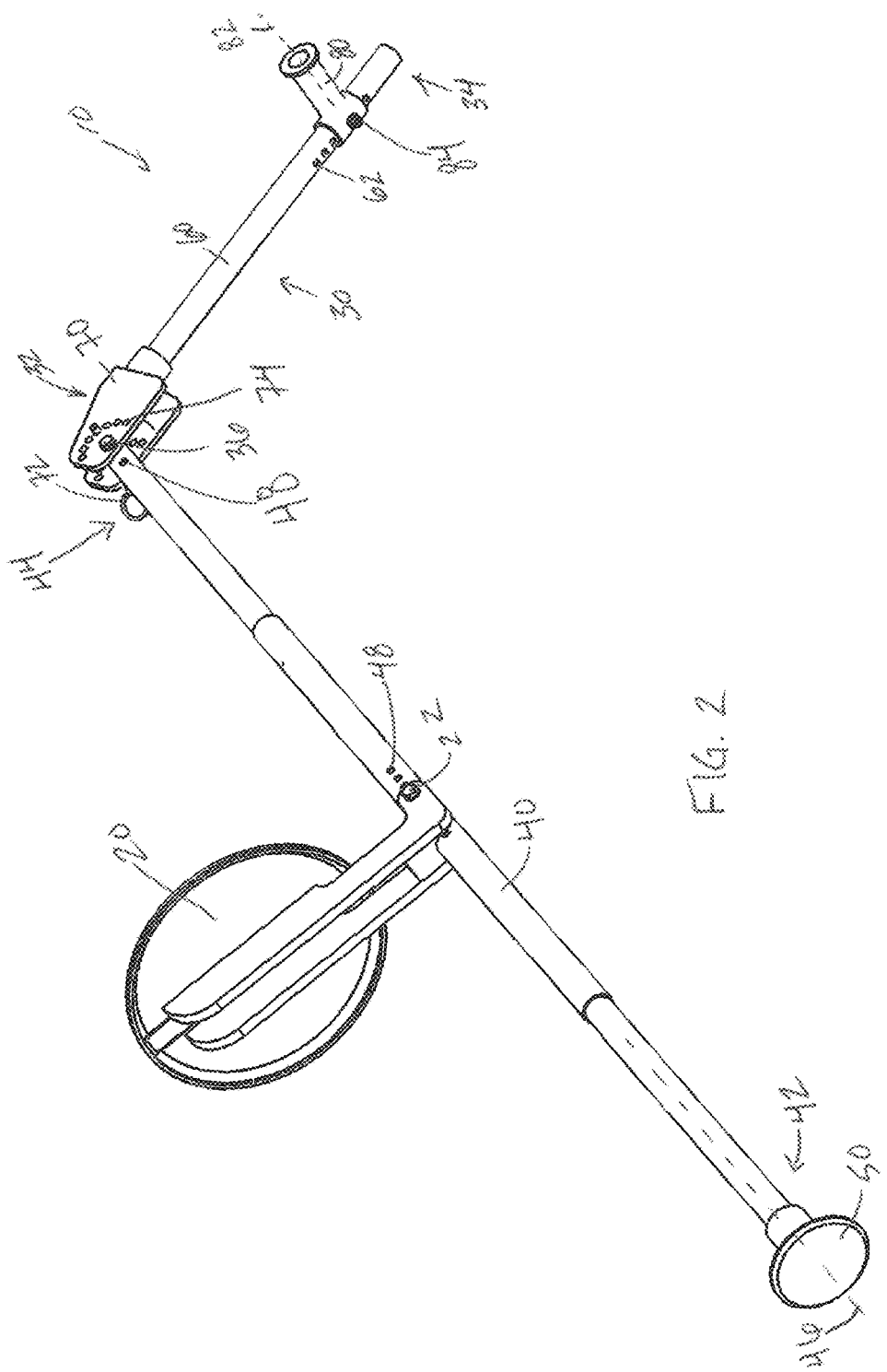
Figure 3:
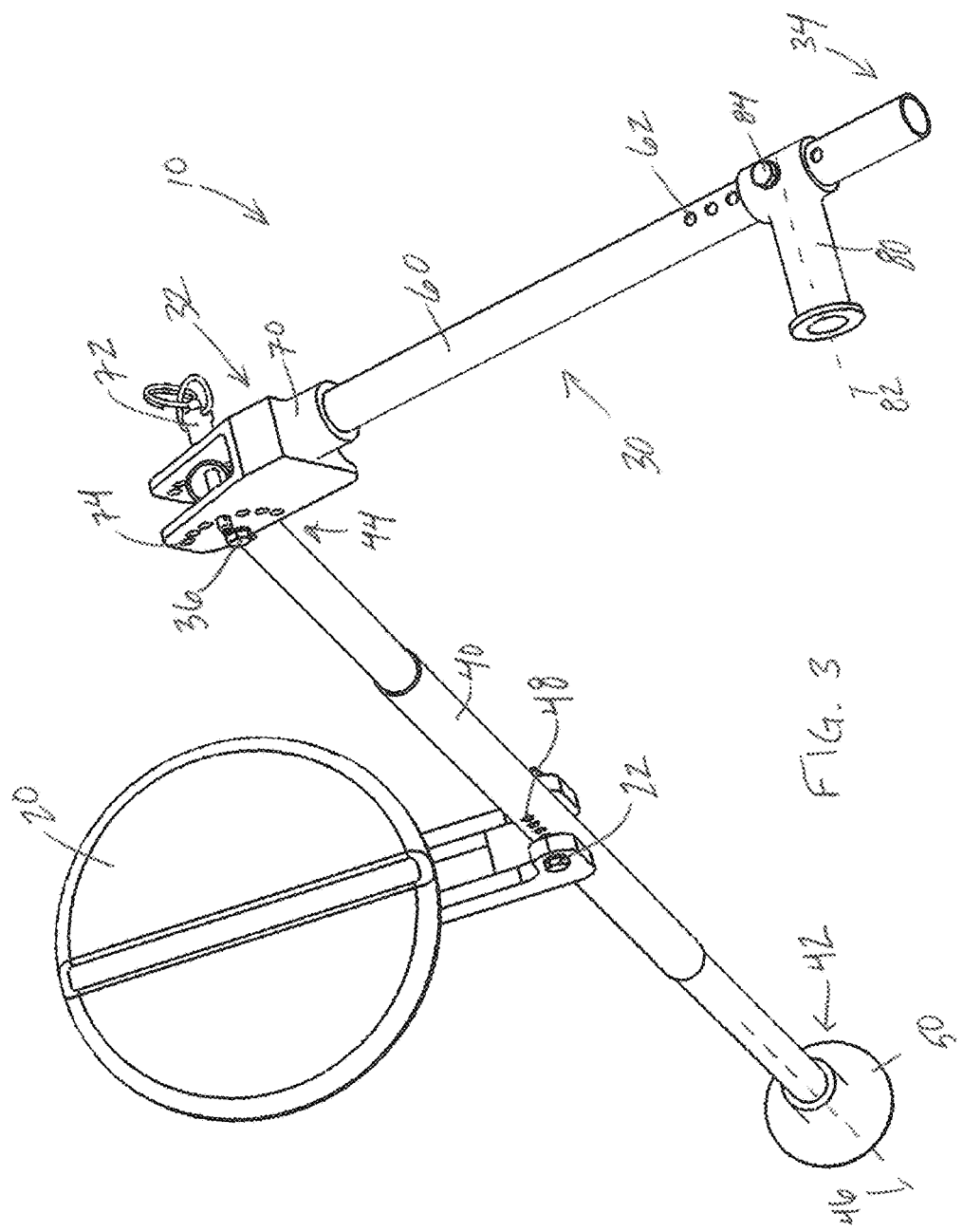
Figure 5:
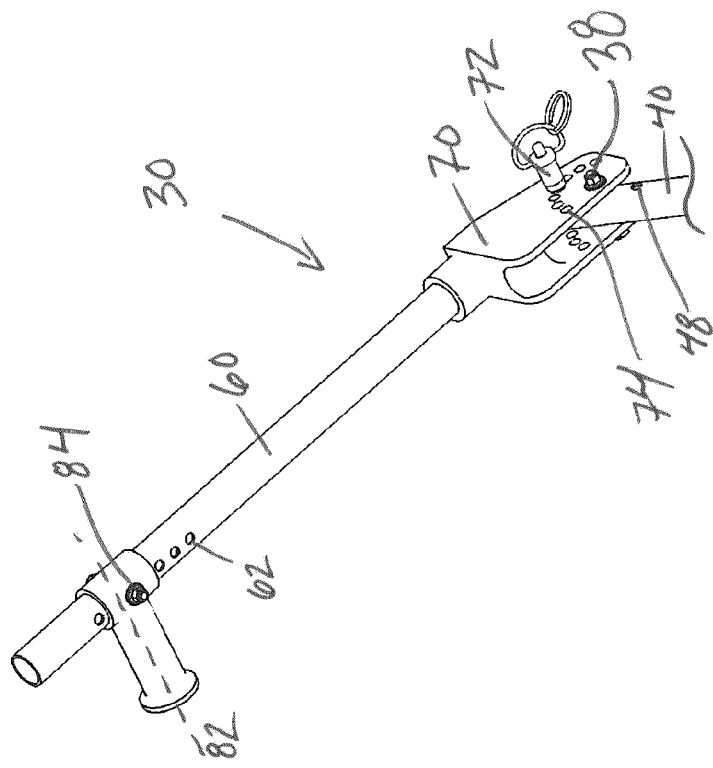
Figure 4:
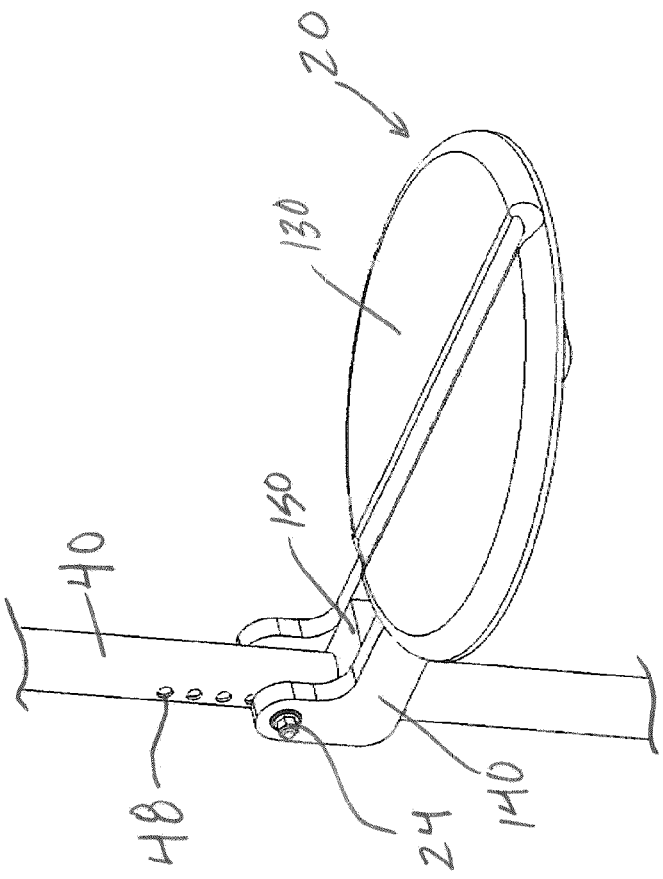

As shown in FIGS. 1-5, seat 20 and rest 30 are movably coupled to a pole assembly, shown as pole assembly 40. Seat 20, rest 30, and/or pole assembly 40 may be manufactured using a metallic material (e.g., aluminum, etc.) and/or a nonmetallic material (e.g., abs plastic, etc.). According to an exemplary embodiment, in operation, a user sits on seat 20 and faces rest 30 and/or pole assembly 40. As shown in FIGS. 1-3, portable seat 10 includes an interface, shown as foot 50, that is coupled to pole assembly 40. In one embodiment, foot 50 is configured to engage a ground surface (e.g., during use of portable seat 10, etc.). Foot 50 may be provided with pole assembly 40 such that a first end, shown as first end 42, of pole assembly 40 is configured to engage the ground surface. As shown in FIGS. 1-3, pole assembly 40 has an opposing second end 44. Opposing second end 44 of pole assembly 40 is spaced from first end 42 by a length of pole assembly 40, according to an exemplary embodiment.

According to an exemplary embodiment, rest 30 is coupled to opposing second end 44 of pole assembly 40. By way of example, rest 30 may be attached to opposing second end 44 of pole assembly 40. By way of another example, rest 30 may extend from opposing second end 44 of pole assembly 40. According to the exemplary embodiment shown in FIGS. 1-3, rest 30 is elongated and has a proximal end 32 and a distal end 34. Proximal end 32 is coupled to pole assembly 40, and distal end is spaced from proximal end 32 by a length of rest 30, according to an exemplary embodiment. According to the exemplary embodiment shown in FIGS. 1-3, rest 30 is a separate component that is attached to pole assembly 40 (e.g., movably attached, detachably coupled, welded or otherwise fixed, etc.). In other embodiments, rest 30 is integrally formed and defines a single unitary body with pole assembly 40. By way of example, a rod (e.g., shaft, tubular element, etc.) may be bent to form one or more rods of rest 30 and one or more rods of pole assembly 40.

Referring still to the exemplary embodiment shown in FIGS. 1-4, seat 20 is positioned along the length of pole assembly 40. In one embodiment, seat 20 is positioned between first end 42 and opposing second end 44 of pole assembly 40. Portable seat 10 having seat 20 positioned along the length of pole assembly 40 may facilitate the incorporation of rest 30 into a single, transportable, and selectively movably deployable unit.

According to an exemplary embodiment, seat 20 and rest 30 are pivotally coupled to pole assembly 40. In other embodiments, one of seat 20 and rest 30 are pivotally coupled to pole assembly 40. As shown in FIGS. 1-4, seat 20 includes a pin, shown as bolt 22, that interfaces with a portion of pole assembly 40 to facilitate selectively repositioning seat 20 between a first configuration (e.g., deployed position, deployed orientation, use position, use orientation, etc.) and a second configuration (e.g., storage position, storage orientation, transport position, transport orientation, etc.). According to the exemplary embodiment shown in FIGS. 1-4, pole assembly 40 and seat 20 define a pair of cooperating apertures that receive bolt 22 to pivotally attach seat 20 to pole assembly 40. Bolt 22 is held in place using a fastener, shown as nut 24, according to an exemplary embodiment. In other embodiments, the pin is a shaft that is held in place in engagement with seat 20 and pole assembly 40 (e.g., a bent or T-shaped pin with a quick clip, a rivet, etc.). In still other embodiments, seat 20 is otherwise pivotally attached to pole assembly 40. As shown in FIGS. 1-4, rest 30 includes a pin, shown as bolt 36, that interfaces with a portion of pole assembly 40 to facilitate selectively repositioning rest 30 between a first configuration (e.g., deployed position, deployed orientation, use position, use orientation, etc.) and a second configuration (e.g., storage position, storage orientation, transport position, transport orientation, etc.). According to the exemplary embodiment shown in FIGS. 1-4, pole assembly 40 and rest 30 define a pair of cooperating apertures that receive bolt 36 to pivotally attach rest 30 to pole assembly 40. Bolt 36 is held in place using a fastener, shown as nut 38, according to an exemplary embodiment. In other embodiments, the pin is a shaft that is held in place in engagement with rest 30 and pole assembly 40 (e.g., a bent or T-shaped pin with a quick clip, a rivet, etc.). In still other embodiments, rest 30 is otherwise pivotally attached to pole assembly 40.

As shown in FIGS. 1-10, portable seat 10 is selectively reconfigured into a first orientation (e.g., deployed position, deployed orientation, use position, use orientation, etc.). As shown in FIGS. 11-15, portable seat 10 is selectively reconfigured into a second orientation (e.g., storage position, storage orientation, transport position, transport orientation, etc.). In the second orientation, portable seat 10 may have an overall width of 8.5 inches and an overall length of 41 inches. A user may selectively reconfigure portable seat 10 into the second orientation from the first orientation by repositioning (e.g., folding, etc.) seat 20 toward pole assembly 40 (e.g., upward toward pole assembly 40, etc.) and repositioning (e.g., folding, etc.) rest 30 toward pole assembly 40 (e.g., downward toward pole assembly 40, etc.). When disposed in the first orientations, seat 20 and rest 30 extend in different, opposing directions (e.g., extend from opposing lateral sides of pole assembly 40, etc.).

As shown in FIG. 7, when selectively reconfigured into the first orientation, seat 20 is angularly offset at an offset angle α relative to an axis 46 defined by pole assembly 40. By way of example, the offset angle α may be 90 degrees. By way of another example, the offset angle α may be less than 90 degrees (e.g., when measured from a portion of pole assembly 40 above which seat 20 is attached, etc.) such that seat 20 is parallel to the ground surface when the pole assembly is tipped forward at a tip angle when in use. Seat 20 may be parallel to the axis 46 defined by pole assembly 40 when selectively reconfigured into the second orientation. When selectively reconfigured into the first orientation, rest 30 may be angularly offset at an offset angle θ relative to the axis 46 defined by pole assembly 40. By way of example, the offset angle θ may be 100 degrees. In one embodiment, the offset angle θ is obtuse such that rest 30 is parallel to the ground surface when the pole assembly is tipped forward at the tip angle when in use. Rest 30 may be parallel to the axis defined by pole assembly 40 when selectively reconfigured into the second orientation.

Referring still to FIGS. 1-15, rest 30 includes a first support, shown as rod assembly 60, coupled to pole assembly 40 with a yoke, shown as yoke 70. Rod assembly 60 and/or pole assembly 40 may have a circular cross sectional shape (e.g., 1 inch diameter tube, etc.) and/or still another shape. Yoke 70 may be disposed at proximal end 32 of rest 30 (e.g., attached to proximal end 32, at least partially defining proximal end 32, etc.). In one embodiment, yoke 70 is movably coupled to pole assembly 40.

According to the exemplary embodiment shown in FIGS. 1-15, rest 30 includes a second support, shown as rifle rest 80, that projects from rod assembly 60. Rifle rest 80 is coupled to rod assembly 60, according to an exemplary embodiment. In one embodiment, rifle rest 80 is configured to support one or more portions of a rifle (e.g., the barrel, the stock, a shooter's hand that is holding the barrel or stock, etc.) to steady the rifle and thereby improve the shooter's accuracy. In other embodiments, the second support is configured to support another device (e.g., a camera, etc.).

According to the exemplary embodiment shown in FIG. 8, one or more components of portable seat 10 have adjustable lengths. In one embodiment, pole assembly 40 includes one or more components such that the length thereof is adjustable. As shown in FIG. 8, pole assembly 40 includes a first tube 90 and a second tube 92 disposed at least partially within a third tube 100. In other embodiments, at least one of first tube 90 and second tube 92 are solid elements (i.e., non-tubular, etc.). In still other embodiments, pole assembly 40 includes only one tube that is disposed at least partially within an outer tube. First tube 90 and second tube 92 may engage a portion of third tube 100 to selectively vary the length of pole assembly 40. According to the embodiment shown in FIG. 8, first tube 90 and second tube 92 include retainers (e.g., a spring-loaded button, etc.) that interface with one of a plurality of apertures 102 defined by third tube 100. A user may engage (e.g., depress, etc.) the retainers, adjust first tube 90 and second tube 92 within the third tube 100 (e.g., further insert, withdraw, etc.) and release the retainers to selectively vary the length of pole assembly 40. In one embodiment, the length of pole assembly 40 is variable from 41 inches to 51 inches. Portable seat 10 including pole assembly 40 that has an adjustable length may accommodate users having different heights, torso lengths, or still other features.

Additionally or alternatively, rod assembly 60 of rest 30 may include one or more components such that the length thereof is adjustable. As shown in FIG. 8, rod assembly 60 includes a first tube 110 disposed at least partially within a second tube 120. In other embodiments, at least one of first tube 110 and second tube 120 are solid elements (i.e., non-tubular, etc.). First tube 110 may engage a portion of second tube 120 to selectively vary the length of rod assembly 60. According to the embodiment shown in FIG. 8, first tube 110 includes a retainer (e.g., a spring-loaded button, etc.) that interfaces with one of a plurality of apertures 122 defined by second tube 120. A user may depress the loaded retainer, adjust the first tube 110 within the second tube 120 (e.g., further insert, withdraw, etc.) and release the retainer to selectively vary the length of rod assembly 60 and therefore adjust the length of rest 30. In one embodiment, rod assembly 60 is adjustable to have a length of 14.5 inches to 24.5 inches. Portable seat 10 including a rest 30 that has an adjustable length may accommodate users having different arm lengths, different lengths of guns, or still other features of the users and/or the users' equipment.

Referring to the exemplary embodiment shown in FIGS. 1-15, yoke 70 is pivotally coupled to pole assembly 40 with bolt 36 and a second pin, shown as pin 72. Pin 72 may be a Carr Lane 4BLPR150 ball lock pin 1-4×1.25. In other embodiments, pin 72 is still another device. In one embodiment, yoke 70 defines a plurality of apertures, shown as pin receptacles 74. Pole assembly 40 defines an aperture (e.g., positioned further toward the end of pole assembly 40 relative to the aperture that receives bolt 36, etc.) that cooperates with one of the pin receptacles 74 to receive pin 72 and selectively secure the orientation of rest 30, according to an exemplary embodiment. In one embodiment, pin receptacles 74 are positioned in an arc configuration.

A user may pivot rest 30 about bolt 36 until one of the pin receptacles 74 cooperate with (e.g., line up with, etc.) the aperture defined by pole assembly 40. The user may thereafter insert pin 72 through the pin receptacle 74 and the aperture defined by pole assembly 40 to selectively fix the orientation of rest 30 (e.g., relative to pole assembly 40, etc.). The user may thereby adjust the offset angle θ of the rest 30 relative to the pole assembly 40 (e.g., to adjust the angle at which pole assembly 40 must be tipped such that rest 30 is parallel to a ground surface, to accommodate the slope of the surrounding terrain, etc.). In other embodiments, rest 30 is otherwise movably coupled to pole assembly 40. By way of example, rest 30 may be coupled to pole assembly 40 with a plurality of teeth that may be indexed into preset positions and held together with a screw or other fastener. By way of another example, rest 30 may be coupled to pole assembly 40 with a pair of mating friction disks that are selectively held together with a screw or other fastener. By way of yet another example, rest 30 may be attached to pole assembly 40 with a pair of mating couplers that are selectively repositionable without fasteners (e.g., a spring-detent arrangement whereby a threshold force is required to disengage a ball from a detent and thereby rotate rest 30 relative to pole assembly 40, etc.).

As shown in FIGS. 1-15, pin 72 includes a retainer (e.g., a spring-loaded ball, etc.) that extends from a body of pin 72 to hold pin 72 in place (e.g., prevent pin 72 from withdrawing from pin receptacle 74 and/or the aperture defined by pole assembly 40, etc.). In other embodiments, a retainer (e.g., a clip, a nut or other fastener, etc.) interfaces with pin 72 to prevent pin 72 from withdrawing from pin receptacle 74 and/or the aperture defined by pole assembly 40.

Referring still to the exemplary embodiment shown in FIG. 1, pole assembly 40 defines a plurality of apertures 48 disposed in a linear array at the opposing second end 44 thereof. Any two of the apertures 48 may selectively receive bolt 36 and pin 72 such that the position of rest 30 along pole assembly 40 may be varied by a user. In one embodiment, portable seat 10 including pole assembly 40 that has a plurality of apertures accommodates users having various body shapes (e.g., longer torsos, shorter torsos, etc.).

According to the exemplary embodiment shown in FIGS. 1-4, pole assembly 40 and seat 20 define a pair of cooperating apertures that receive bolt 22 to pivotally attach seat 20 to pole assembly 40. As shown in FIGS. 1-4, pole assembly 40 defines a plurality of apertures 48. Any one of the apertures 48 may cooperate with an aperture defined by seat 20 and bolt 22 to pivotally secure seat 20 to pole assembly 40. In one embodiment, the apertures 48 are disposed in a linear array along the length of pole assembly 40. Portable seat 10 including pole assembly 40 having a plurality of apertures 48 may accommodate users having various body shapes (e.g., longer legs, shorter legs, different overall heights etc.) because the height of seat 20 relative to a ground surface with which first end 42 of pole assembly 40 engages during use may be adjusted (e.g., 5 inches of adjustment in 1 inch intervals, etc.). In still other embodiments, seat 20 is otherwise attached to pole assembly 40 (e.g., pole assembly 40 may define a slot that receives bolt 22, etc.).

As shown in FIGS. 1-8, rod assembly 60 and pole assembly 40 are disposed within a common plane. In one embodiment, rifle rest 80 is elongated and extends along (e.g., defines, etc.) an axis 82. Axis 82 may be orthogonal to the common plane within which rod assembly 60 and pole assembly 40 are disposed. As shown in FIGS. 1-7 and 22-28, rifle rest 80 has a circular body portion that is attached to rod assembly 60. According to the embodiment shown in FIGS. 8-17, rifle rest 80 includes a pad that is attached to rod assembly 60. A lip may be coupled to the circular body portion or the pad and spaced from the rod assembly 60 by a width of the circular body portion or the pad. In one embodiment, the pad is 2.5 inches wide and 3 inches long. The lip may be 0.5 inches wide, 3 inches long, and 0.75 inches tall (e.g., measured from the bottom of the pad, etc.). The pad may extend generally along axis 82.

In one embodiment, rifle rest 80 is detachably coupled to rod assembly 60. As shown in FIG. 1, rod assembly 60 defines a plurality of apertures 62. Any one of the apertures 62 may cooperate with an aperture defined by rifle rest 80 to receive a pin, shown as bolt 84, and secure rifle rest 80 in place. A user may remove bolt 84, slide rifle rest 80 along the length of rod assembly 60, and insert bolt 84 into another of the apertures 62 to adjust an effective length of rest 30 (e.g., to accommodate users having different arm lengths, different lengths guns, or still other features of the users and/or the users' equipment, etc.). A user may also remove bolt 84 and rotate rifle rest 80 between a first or right-handed orientation shown in FIGS. 1-8 and a second or left-handed orientation shown in FIGS. 16 and 17. Portable seat 10 having a selectively repositionable rifle rest 80 may accommodate both right-handed shooters (e.g., with rifle rest 80 in the first orientation, etc.) and left handed shooters (e.g., with rifle rest 80 in the second orientation, etc.). Rifle rest 80 may extend from a first or right lateral side of rod assembly 60 when in the first orientation and extend from a second or left lateral side of rod assembly 60 when in the second orientation.

Figure 17:
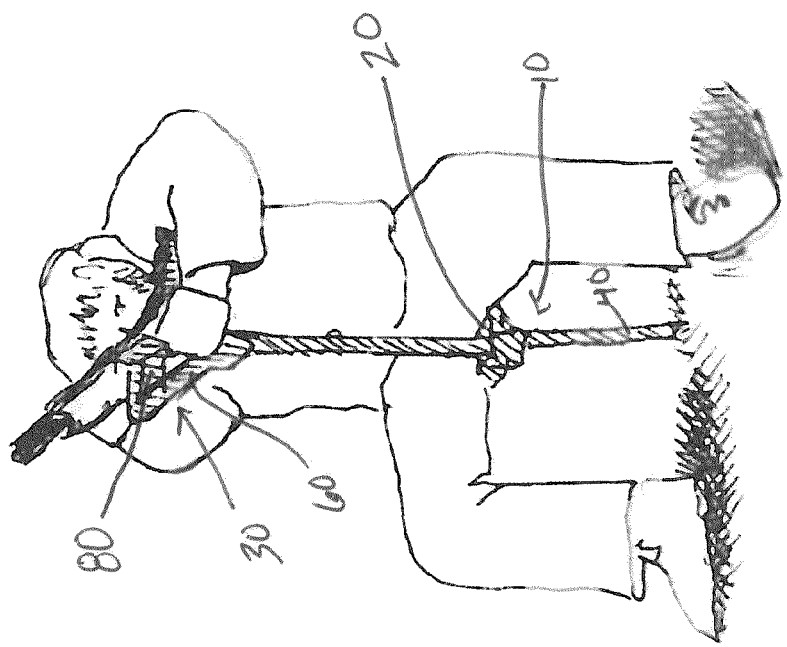
FIGS. 16 and 17 are perspective views of a user sitting on a portable seat and utilizing a rest provided as part thereof, according to an exemplary embodiment.
Figure 16:
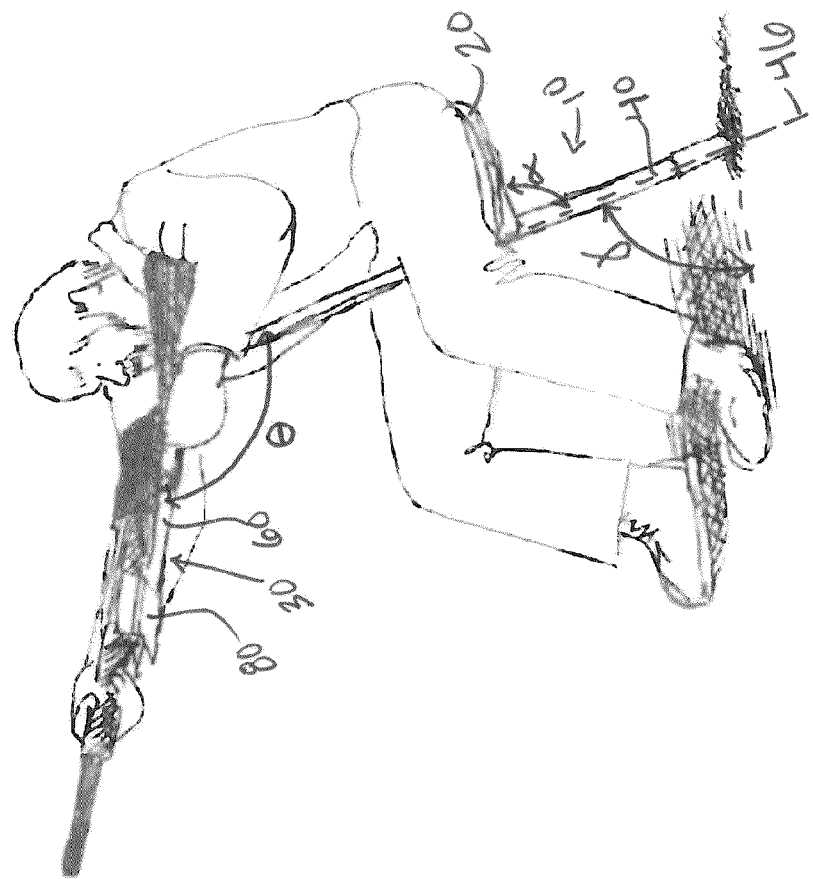

As shown in FIGS. 16 and 17, a user may straddle pole assembly 40 during use of portable seat 10. In one embodiment, first end 42 is disposed generally below seat 20 (e.g., behind an attachment point between seat 20 and pole assembly 40 relative to a direction the user faces when sitting on seat 20 and using portable seat 10, etc.). As shown in FIGS. 16 and 17, the user's legs are disposed on either lateral side of pole assembly 40 during use of portable seat 10. Only pole assembly 40 and the user's feet hold the user and portable seat 10 upward (e.g., forming a tripod structure, etc.), according to an exemplary embodiment. As shown in FIGS. 16 and 17, a user may vary the angle γ at which axis 46 of pole assembly 40 is positioned relative to the ground surface (e.g., the tip angle, etc.). In one embodiment, the user may tip the gun, camera, or other device supported by rest 30 upward or downward by only changing the degree to which the user's knees are bent. The user may swing the gun, camera, or other device supported by rest 30 by only rotating the user's torso. The user may also swing the gun, camera, or other device supported by rest 30 by only rotating the user's torso and repositioning one or more of the user's feet (e.g., shuffling the user's feet, picking up and setting down only one foot, etc.). Portable seat 10 therefore facilitates a user's ability to quietly and fluidly target or track moving game without mechanically adjusting one or more components of the portable seat itself (e.g., without mechanically adjusting the seat, without mechanically adjusting the rest, etc.).

As shown in FIGS. 18-21, yoke 70 includes a pair of supports, shown as arms 76, that define pin receptacles 74. Arms 76 are spaced relative to one another and configured to receive opposing second end 44 of pole assembly 40, according to an exemplary embodiment. In one embodiment, arms 76 are open at top and bottom sides thereof such that yoke 70 may be positioned at or below the end of pole assembly 40 (e.g., yoke 70 may be positioned such that the end of pole assembly 40 terminates between arms 76, or arms 76 of yoke 70 may selectively receive a middle portion of pole assembly 40 therebetween, etc.). The body of yoke 70 defines an interface portion, shown as curved portion 78, that is shaped to correspond with the shape of pole assembly 40, according to an exemplary embodiment. The shape of curved portion 78 (i.e., the relief provided by curved portion 78, etc.) reduces the size of portable seat 10 when selectively reconfigured into the second, storage orientation, according to an exemplary embodiment.

As shown in FIGS. 22-28, rifle rest 80 includes a first portion, shown as base portion 86 and a second portion, shown as interface portion 88. Interface portion 88 is tubular and receives rod assembly 60, according to an exemplary embodiment. Base portion 86 extends along axis 82, according to an exemplary embodiment. Base portion 86 may have an exterior surface upon which a rifle or other device is disposed. Base portion 86 may include a lip positioned opposite interface portion 88. The lip and interface portion 88 may cooperate to hold (e.g., cradle, etc.) a rifle or other device disposed on the exterior surface of base portion 86. In one embodiment, base portion 86 extends perpendicularly from interface portion 88. Interface portion 88 may define an aperture that receives bolt 84 to couple rifle rest 80 and rod assembly 60. According to the alternative embodiment shown in FIG. 11, rifle rest 80 is coupled to an end of rod assembly 60 and pivots into the various operating orientations in response to engagement of a button or other retainer. In still other embodiments, rifle rest 80 has another shape and/or configuration (e.g., base portion 86 may be a plate having a flange or lip, etc.).

As shown in FIG. 29-36, seat 20 includes a base, shown as molding 130, coupled to a pair of supports, shown as arms 140. In one embodiment, molding 130 has a surface configured to support a user. Molding 130 may be circular or may have another shape (e.g., rectangular, etc.). In one embodiment, molding 130 has a diameter of 8.5 inches, a thickness of 0.125 inches, and an overall height of 0.5 inches. Arms 140 may be movably coupled to pole assembly 40 (e.g., arms 140 may define apertures that correspond with apertures 48 and receives bolt 22. Seat 20 further includes a stop, shown as stop 150, that is disposed between and coupled to arms 140, according to an exemplary embodiment. Stop 150 has a portion shaped to interface with a portion of pole assembly 40. As shown in FIGS. 37-39, stop 150 has a curved portion shaped to interface with pole assembly 40 and thereby hold seat 20 at a target offset angle relative to pole assembly 40 (e.g., during use of portable seat 10, etc.). In one embodiment, the angle α is not adjustable.

In other embodiments, stop 150 or another portion of seat 20 may be selectively repositioned such that the angle α of seat 20 may be adjusted.

As shown in FIGS. 40 and 41, foot 50 includes a first portion, shown as base portion 52, and a second portion, shown as engagement portion 54. In one embodiment, base portion 52 receives a portion of pole assembly 40. Engagement portion 54 may interface with a ground surface during use of portable seat 10. In one embodiment, engagement portion 54 has a cross-sectional area that is larger than the cross-sectional area of base portion 52, providing a larger footprint within which portable seat 10 is configured to engage the ground surface. Providing a larger footprint may reduce the risk of portable seat 10 penetrating (e.g., sinking into, etc.) the ground surface. In some embodiments, foot 50 is detachably coupled to pole assembly 40 (e.g., with a removable fastener, with a friction fit, etc.). Portable seat 10 may have various feet 50 that are each particularly designed for one or more specific environments, terrain, and/or conditions. Portable seat 10 may therefore include interchangeable feet 50 to provide a modular seating solution. By way of example, a foot 50 may have a rubberized and/or non-skid bottom surface (e.g., to improve stability and/or traction on slippery surfaces, etc.). By way of another example, a foot 50 may have a pointed end (e.g., to improve stability on rocky terrain, etc.). By way of another example, a foot 50 may include an engagement portion 54 having a larger engagement surface than that shown in FIGS. 40 and 41 (e.g., to improve stability in marshy terrain, etc.). Portable seat 10 may include an "all purpose" foot 50 (e.g., the foot shown in FIGS. 40 and 41, etc.) in addition to one or more other, "special purpose" feet 50. In still other embodiments, foot 50 is fixed to pole assembly 40.

Figure 42:
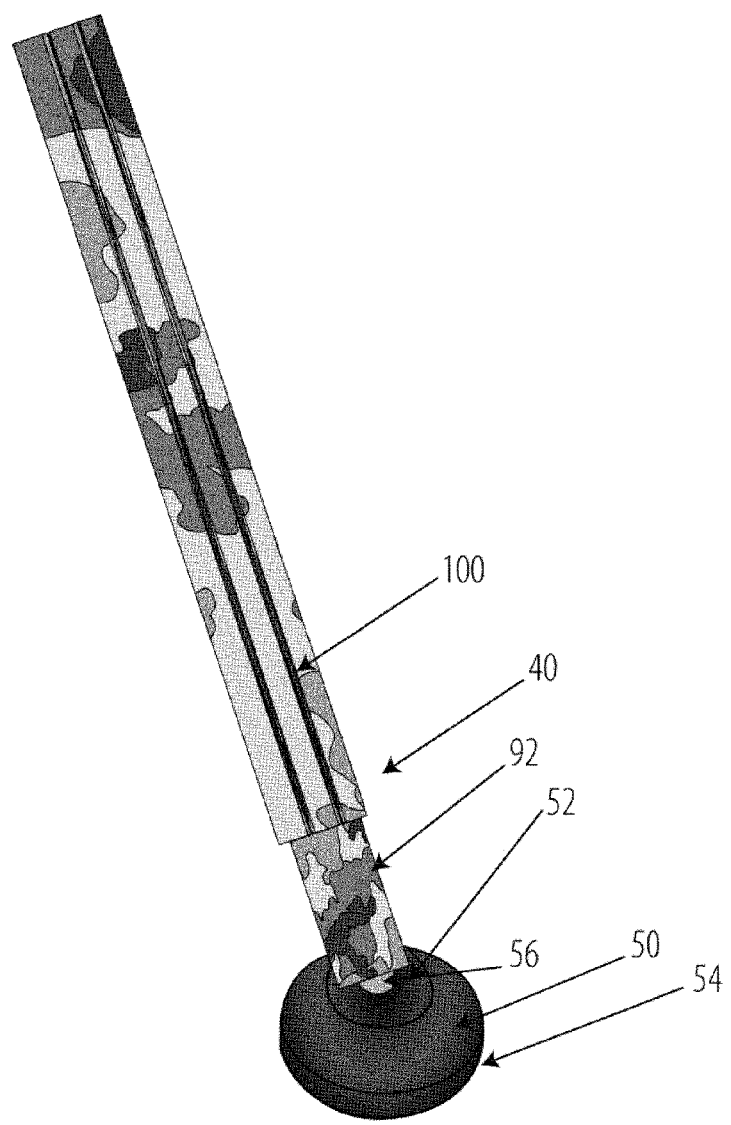

According to the exemplary embodiment shown in FIG. 42, foot 50 is movably coupled to pole assembly 40. By way of example, foot 50 may be movably coupled to second tube 92 of pole assembly 40. As shown in FIG. 42, foot 50 is pivotally coupled to second tube 92 with a joint, shown as joint 56 (e.g., thereby providing an articulated foot 50, etc.). Portable seat 10 having foot 50 coupled to pole assembly 40 with joint 56 has enhanced stability (e.g., on slippery surfaces, etc.) at least because improved ground contact (e.g., full ground contact, etc.) is maintained even when pole assembly 40 is tilted (e.g., forward and away from the user during use, etc.). Joint 56 includes a ball that is fixed to pole assembly 40 (e.g., welded, bolted, riveted, etc.) and received by an aperture defined by foot 50 (e.g., a corresponding spherical aperture defined by base portion 52, etc.), according to the exemplary embodiment shown in FIG. 42. At least a portion of the aperture defined by foot 50 may have a dimension (e.g., diameter, etc.) that is smaller than a corresponding dimension of the ball such that the aperture receives and retains the ball (e.g., such that the ball is retained by foot 50 with a snap-fit connection, etc.). In other embodiments, foot 50 is otherwise movably coupled to pole assembly 40 (e.g., pole assembly 40 may define a slot that receives a rod fixed to foot assembly 50 such that foot assembly 50 may rotate about the rod, foot 50 may be selectively articulable relative to pole assembly 40, etc.). In still other embodiments, foot 50 is fixed to pole assembly 40. By way of example, foot 50 may have an engagement portion 54 that is angularly offset (e.g., tilted, etc.) relative to pole assembly 40 (e.g., such that engagement portion 54 is parallel with the ground surface when pole assembly 40 is tilted into a use orientation, etc.). Portable seat 10 having foot 50 with an angularly offset engagement portion 54 has enhanced stability (e.g., on slippery surfaces, etc.) at least because improved ground contact (e.g., full ground contact, etc.) is maintained even when pole assembly 40 is tilted (e.g., forward and away from the user during use, etc.).

The construction and arrangement of the systems as shown in the various exemplary embodiments are illustrative only. Although only a few embodiments have been described in detail, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A portable hunting seat, comprising:
   a pole assembly comprising a monopod, single leg structure and having a first end and an opposing second end, wherein the first end is configured to engage a ground surface, wherein the opposing second end is spaced from the first end by a length of the pole assembly, and wherein the pole assembly extends linearly along an axis between the first end and the opposing second end;
   a seat positioned along the length of the pole assembly, between the first end and the opposing second end; and
   a gun rest extending from the opposing second end of the pole assembly;
   wherein the seat and the gun rest are movably coupled to the pole assembly such that the portable hunting seat is selectively reconfigurable between a deployed orientation and a transport orientation;
   wherein the seat has a surface configured to support a user, wherein the seat is angularly offset relative to the pole assembly at an offset angle when the portable hunting seat is selectively reconfigured into the deployed orientation, and wherein the seat is generally parallel to the pole assembly when the portable hunting seat is selectively reconfigured into the transport orientation;
   wherein the gun rest includes a first support and a second support, wherein the first support is movably coupled to the opposing second end of the pole assembly, and wherein the second support projects from the first support;
   wherein the pole assembly and the first support extend within a common plane, and wherein the second support extends along an axis that is orthogonal to the common plane;
   wherein the second support is selectively reconfigurable between a right-handed orientation and a left-handed orientation;
   wherein the second support extends from a first lateral side of the first support when selectively reconfigured into the right-handed orientation and a second lateral side of the first support when selectively reconfigured into the left-handed orientation to thereby accommodate both right-handed and left-handed shooters;
   wherein the gun rest is selectively reconfigurable between a deployed orientation and a transport orientation, and wherein the first support is generally parallel to the pole assembly when the gun rest is selectively reconfigured into the transport orientation.

2. The portable hunting seat of claim 1, wherein the seat includes a pair of arms, wherein the pair of arms are spaced relative to one another and receive a portion of the pole assembly therebetween, wherein the pair of arms are movably coupled to the pole assembly.

3. The portable hunting seat of claim 2, wherein the seat includes a stop disposed between the pair of arms and configured to interface with the pole assembly to hold the seat at the offset angle during use of the portable hunting seat.

4. The portable hunting seat of claim 1, wherein the gun rest includes a yoke having a pair of arms, wherein the pair of arms are spaced relative to one another and receive the opposing second end of the pole assembly therebetween, wherein the yoke is movably coupled to the opposing second end of the pole assembly.

5. The portable hunting seat of claim 4, further comprising a pin and a retainer, wherein the yoke is pivotally coupled to the opposing second end of the pole assembly with the pin, wherein the yoke defines a plurality of apertures that define a plurality of discrete operating orientations, and wherein the plurality of apertures are configured to interface with the retainer to lock the gun rest into one of the discrete operating orientations.

6. The portable hunting seat of claim 1, wherein the first end of the pole assembly includes a foot, wherein the foot has a pad configured to engage the ground surface.

7. A portable seat, comprising:
a pole assembly comprising a monopod, single leg structure and having a first end and an opposing second end, wherein the opposing second end is spaced from the first end by a length of the pole assembly, and wherein the pole assembly extends linearly along an axis between the first end and the opposing second end;
a seat positioned along the length of the pole assembly, between the first end and the opposing second end; and
a rest having an elongated shape and including a proximal end movably coupled to the opposing second end of the pole assembly;
wherein the seat and the rest are movably coupled to the pole assembly such that the portable seat and the rest are each selectively reconfigurable between a first orientation and a second orientation;
wherein the rest is angularly offset relative to the pole assembly at an offset angle when the rest is selectively reconfigured into the first orientation and wherein the rest is generally parallel to the pole assembly when the rest is selectively reconfigured into the second orientation;
wherein the seat is angularly offset relative to the pole assembly at an offset angle when the seat is selectively reconfigured into the first orientation and wherein the seat is generally parallel to the pole assembly when the seat is selectively reconfigured into the second orientation.

8. The portable seat of claim 7, wherein the seat has a surface configured to support a user, wherein the seat is angularly offset relative to the pole assembly at an offset angle when the portable seat is selectively reconfigured into the first orientation, and wherein the seat is generally parallel to the pole assembly when the portable seat is selectively reconfigured into the second orientation.

9. The portable seat of claim 8, wherein the seat includes a pair of arms, wherein the pair of arms are spaced relative to one another and receive a portion of the pole assembly therebetween, wherein the pair of arms are movably coupled to the pole assembly.

10. The portable seat of claim 9, wherein the seat includes a stop disposed between the pair of arms and configured to interface with the pole assembly to hold the seat at the offset angle during use of the portable seat.

11. The portable seat of claim 7, wherein the rest includes a yoke having a pair of arms, wherein the pair of arms are spaced relative to one another and receive the opposing second end of the pole assembly therebetween, wherein the yoke is movably coupled to the opposing second end of the pole assembly.

12. The portable seat of claim 11, further comprising a pin and a retainer, wherein the yoke is pivotally coupled to the opposing second end of the pole assembly with the pin, wherein the yoke defines a plurality of apertures that define a plurality of discrete operating orientations, and wherein the plurality of apertures are configured to interface with the retainer to lock the rest into one of the discrete operating orientations.

13. The portable seat of claim 7, wherein the first end of the pole assembly includes a foot, wherein the foot has a pad configured to engage a ground surface.

* * * * *